US012015686B2

(12) United States Patent
Lee et al.

(10) Patent No.: US 12,015,686 B2
(45) Date of Patent: Jun. 18, 2024

(54) INTELLIGENT MEDIA FEED

(71) Applicant: Ipurangi, Inc., San Francisco, CA (US)

(72) Inventors: Timothy Teck Choon Lee, Los Altos, CA (US); William Anthony Estoque, San Francisco, CA (US)

(73) Assignee: Ipurangi, Inc., San Francisco, CA (US)

( * ) Notice: Subject to any disclaimer, the term of this patent is extended or adjusted under 35 U.S.C. 154(b) by 0 days.

(21) Appl. No.: 17/703,723

(22) Filed: Mar. 24, 2022

(65) Prior Publication Data

US 2023/0308524 A1    Sep. 28, 2023

(51) Int. Cl.
*H04L 67/60* (2022.01)
*G06F 16/44* (2019.01)
*G06F 16/48* (2019.01)
*G06F 3/14* (2006.01)

(52) U.S. Cl.
CPC .............. *H04L 67/60* (2022.05); *G06F 16/44* (2019.01); *G06F 16/489* (2019.01); *G06F 3/14* (2013.01)

(58) Field of Classification Search
CPC ....... H04L 67/60; G06F 16/44; G06F 16/489; G06F 3/14
See application file for complete search history.

(56) References Cited

U.S. PATENT DOCUMENTS

| | | | |
|---|---|---|---|
| 8,380,710 B1* | 2/2013 | Finne | G06F 16/958 707/723 |
| 2008/0086484 A1* | 4/2008 | Darnell | H04L 67/56 |
| 2018/0276227 A1* | 9/2018 | Bowring | G06F 16/9535 |
| 2022/0182699 A1* | 6/2022 | Gordon | H04N 21/64322 |

* cited by examiner

*Primary Examiner* — Sibte H Bukhari
(74) *Attorney, Agent, or Firm* — Schwegman Lundberg & Woessner, P.A.

(57) ABSTRACT

A system to generate and present an intelligent RSS feed that performs operations that include: accessing a media collection from a media host, wherein the media collection may comprise a podcast; caching a sequence of media objects associated with the media collection at a media repository; receiving a request that comprises an identifier associated with the media collection; inserting a media object at a position among the sequence of media objects; and causing display of a presentation of the sequence of media objects at a client device wherein the sequence of media objects includes one or more podcasts, and the presentation of the sequence of media objects includes the media object inserted at the position among the sequence of media objects.

18 Claims, 9 Drawing Sheets

```
ACCESSING A MEDIA COLLECTION FROM A MEDIA HOST, THE MEDIA
COLLECTION COMPRISING A SEQUENCE OF MEDIA OBJECTS
302
              ↓
CACHING THE SEQUENCE OF MEDIA OBJECTS WITHIN A MEDIA
REPOSITORY
304
              ↓
RECEIVING A REQUEST THAT COMPRISES AN IDENTIFIER ASSOCIATED
WITH THE MEDIA COLLECTION
306
              ↓
INSERTING A MEDIA OBJECT AT A POSITION AMONG THE SEQUENCE OF
MEDIA OBJECTS
308
              ↓
CAUSING DISPLAY OF A PRESENTATION OF THE SEQUENCE OF MEDIA
OBJECTS AT A CLIENT DEVICE, THE PRESENTATION OF THE SEQUENCE
OF MEDIA OBJECTS INCLUDING THE MEDIA OBJECT AT THE POSITION
AMONG THE SEQUENCE OF MEDIA OBJECTS
310
```

ACCESSING A FIRST TIMESTAMP ASSOCIATED WITH A FIRST MEDIA OBJECT AMONG THE SEQUENCE OF MEDIA OBJECTS
402

GENERATING A SECOND TIMESTAMP BASED ON THE FIRST TIMESTAMP
404

APPLYING THE SECOND TIMESTAMP TO A SECOND MEDIA OBJECT TO BE INSERTED AMONG THE SEQUENCE OF MEDIA OBJECTS
406

INSERTING THE SECOND MEDIA OBJECT AMONG THE SEQUENCE OF MEDIA OBJECTS BASED ON THE SECOND TIMESTAMP
408

```
┌─────────────────────────────────────────────────────────────┐
│ RECEIVING A REQUEST THAT COMPRISES AN IDENTIFIER ASSOCIATED │
│  WITH THE MEDIA COLLECTION, AND AN ATTRIBUTE ASSOCIATED WITH│
│                     THE CLIENT DEVICE                       │
│                             502                             │
└─────────────────────────────────────────────────────────────┘
                              │
                              ▼
┌─────────────────────────────────────────────────────────────┐
│ SELECTING THE MEDIA OBJECT TO BE INSERTED AMONG THE SEQUENCE│
│  OF MEDIA OBJECTS BASED ON AT LEAST THE ATTRIBUTE ASSOCIATED│
│                    WITH THE CLIENT DEVICE                   │
│                             504                             │
└─────────────────────────────────────────────────────────────┘
                              │
                              ▼
┌─────────────────────────────────────────────────────────────┐
│   INSERTING THE SELECTED MEDIA ITEM AT A POSITION AMONG THE │
│                   SEQUENCE OF MEDIA OBJECTS                 │
│                             506                             │
└─────────────────────────────────────────────────────────────┘
```

INTELLIGENT MEDIA FEED

TECHNICAL FIELD

Embodiments of the present disclosure relate generally to the dissemination of targeted information through communication networks, and more particularly, but not by way of limitation, to a system for an intelligent Really Simple Syndication (RSS) feed.

BACKGROUND

Communication networks, such as the Internet, have become the primary means of disseminating information. More specifically, RSS feeds have become a popular delivery mechanism for users to subscribe to various forms of news and media content via browsers. RSS may be described as a lightweight eXtensible Markup Language (XML) format designed for sharing various forms of content. There are various specifications and standards that further define RSS. Each RSS file contains a list of items. Each item has, for example, a title, a summary, a timestamp, and a link to a Uniform Resource Locator (URL). When an RSS file is updated within a host system, all external sites or user browsers that subscribe to the RSS feed are updated as well.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

As discussed above, RSS feeds have become a popular delivery mechanism for users to subscribe to various forms of news and media content, such as podcasts. For example, in the context of existing systems to disseminate podcasts, when a new podcast episode is released, a typical podcast player executed by a client device will access a host system through a directory to retrieve the appropriate RSS formatted in XML, which may then be displayed at the client device. While these existing systems are able to provide a means for users to access a requested RSS feed, they lack the flexibility to enable content creators themselves to dynamically modify how their content is presented at client devices.

Accordingly, an intelligent RSS system is described herein. According to certain example embodiments, an intelligent RSS system ("the system") may be configured to perform operations that include: accessing a media collection from a media host, the media collection comprising a sequence of media objects, wherein each media object among the sequence of media objects comprises an address, such as a Uniform Resource Locator (URL), that identifies a location of content related to the media object, wherein the content comprises a media file (such as an audio file); caching the sequence of media objects within a media repository; receiving a request that comprises an identifier associated with the media collection; inserting a media object at a position among the sequence of media objects; and causing display of a presentation of the sequence of media objects at a client device, the presentation of the sequence of media objects including the media object at the position among the sequence of media objects. Accordingly, upon receiving a selection of a media object from among the sequence of media objects, the intelligent RSS system may access an address that corresponds with the selected media object in order to present a media file, such as an audio file, associated with the media object. In some embodiments, the media file may include a podcast.

In some embodiments, the system may be configured to select the media object to be presented at the position among the sequence of media objects based on one or more factors that include: a device type of the requesting device; a user profile associated with a user identifier which may be identified by the request; location data associated with the requesting client device; temporal data associated with the request; as well as an application associated with the requesting device.

For example, the request received by the system may comprise request attributes that include metadata that identifies a device type of the requesting device, as well as location data of the requesting device, temporal data, as well as a user identifier associated with a user of the requesting device. Responsive to receiving the request, the system may access a media repository that corresponds with one or more of the request attributes of the request in order to identify and select an appropriate media object to be presented among a sequence of media objects.

In some embodiments, the system may be configured to determine the position to present the media object among the sequence of media objects based on one or more factors that include: a device type of the requesting device; a user profile associated with a user identifier which may be identified by the request; location data associated with the requesting client device; temporal data associated with the request; as well as an application associated with the requesting device.

For example, responsive to receiving the request, the system may access a media repository that corresponds with one or more of the request attributes of the request in order to identify and select an appropriate media object to be presented among a sequence of media objects, wherein each media object may correspond to a specific position among the sequence of media objects.

In some embodiments, the position the media object is presented among the sequence of media objects may be based on a timestamp assigned to the media object. As discussed above, in a typical RSS feed, each RSS file comprises a list of items, wherein each item has properties that include: a title; a summary; a timestamp; and a link to a URL. When an RSS file is updated within a host system, all external sites or user browsers that subscribe to the RSS feed are updated as well, wherein the properties may define a sequence in which the list of items are to be presented.

For example, some content may be rendered as "episodic," wherein the most recent content is presented first, while some content may be rendered as "serial," wherein the content is presented in chronological order. Accordingly, to present a selected media object at a specific position among the sequence of media objects, the intelligent RSS system may generate and apply a timestamp to the selected media object based on the properties of the corresponding RSS feed.

Figure 1:
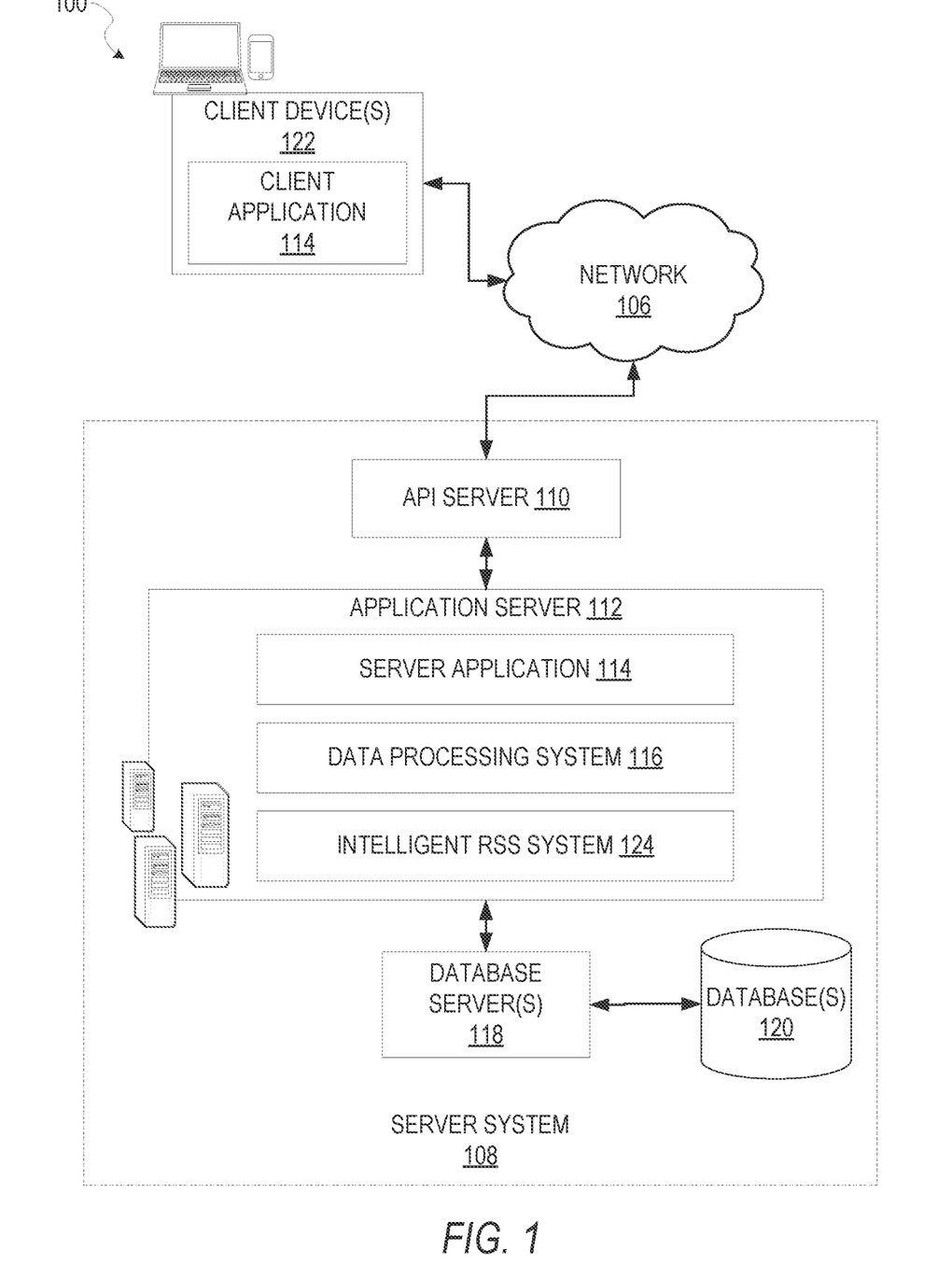
FIG. 1 is a block diagram showing an example system for exchanging data (e.g., sensor data and associated content) over a network in accordance with some embodiments, wherein the system includes an intelligent RSS system.

FIG. 1 is a block diagram showing an example system 100 to provide an intelligent RSS feed, according to certain example embodiments. The system 100 includes one or more client devices 122 that host a number of applications including a client application 114, wherein the client application may include a media player or podcast player.

Accordingly, each client application 114 is able to communicate and exchange data with another client application 114 and with the server application 114 executed at the server system 108 via the network 106. The data exchanged between client applications 114, and between a client application 114 and the server system 108, includes functions (e.g., commands to invoke functions) as well as payload data (e.g., text, audio, video or other multimedia data).

The server system 108 provides server-side functionality via the network 106 to a particular client application 114. While certain functions of the system 100 are described herein as being performed by either a client application 114, or by the server system 108, it will be appreciated that the location of certain functionality either within the client application 114 or the server system 108 is a design choice. For example, it may be technically preferable to initially deploy certain technology and functionality within the server system 108, but to later migrate this technology and functionality to the client application 114, where there may be sufficient processing capacity.

The server system 108 supports various services and operations that are provided to the client application 114. Such operations include transmitting data to, receiving data from, and processing data generated by the client application 114. In some embodiments, this data includes, message content, device information, geolocation information, persistence conditions, social network information, sensor data, temporal information, as examples. In other embodiments, other data is used. Data exchanges within the system 100 are invoked and controlled through functions available via graphical user interfaces (GUIs) of the client application 114.

Turning now specifically to the server system 108, an Application Program Interface (API) server 110 is coupled to, and provides a programmatic interface to, an application server 112. The application server 112 is communicatively coupled to a database server 118, which facilitates access to a database 120 that stores data which may be invoked by the client application 114 and processed by the application server 112. The database 120 may include a media repository, such as a podcast host, wherein the data may comprise one or more RSS feeds in XML format, wherein each RSS feed may be associated with a particular media collection. For example, a media collection may comprise an RSS feed of a particular podcast.

Dealing specifically with the API server 110, this server receives and transmits data (e.g., sensor data, commands, and payloads) between the client device 122 and the application server 112. Specifically, the API server 110 provides a set of interfaces (e.g., routines and protocols) that can be called or queried by the client application 114 in order to invoke functionality of the application server 112. The API server 110 exposes various functions supported by the application server 112, including account registration, login functionality, the transmission of data, via the application server 112, from a particular client application 114 to another client application 114, the sending of sensor data (e.g., images, video, geolocation data, etc.) from a client application 114 to the server application 114, and for possible access by another client application 114, the setting of a collection of data, the retrieval of such collections, the retrieval of data, and the location of devices within a region.

The application server 112 hosts a number of applications and subsystems, including a server application 114, and an intelligent RSS system 124. The intelligent RSS system 124 is configured to perform operations that include: accessing a media collection from a media host, the media collection comprising a sequence of media objects; caching the sequence of media objects within a media repository; receiving a request that comprises an identifier associated with the media collection; inserting a media object at a position among the sequence of media objects; and causing display of a presentation of the sequence of media objects at a client device, the presentation of the sequence of media objects including the media object at the position among the sequence of media objects, according to some example embodiments. Further details of the intelligent RSS system 124 can be found in FIG. 2 below.

The server application 114 implements a number of data processing technologies and functions, particularly related to the aggregation and other processing of data (e.g., sensor data generated by the sensor device 102). Other processor and memory intensive processing of data may also be performed server-side by the server application 114, in view of the hardware requirements for such processing.

The application server 112 is communicatively coupled to a database server 118, which facilitates access to a database 120 which comprises one or more RSS feeds corresponding with various media collections, which may be processed by the server application 114.

Figure 2:
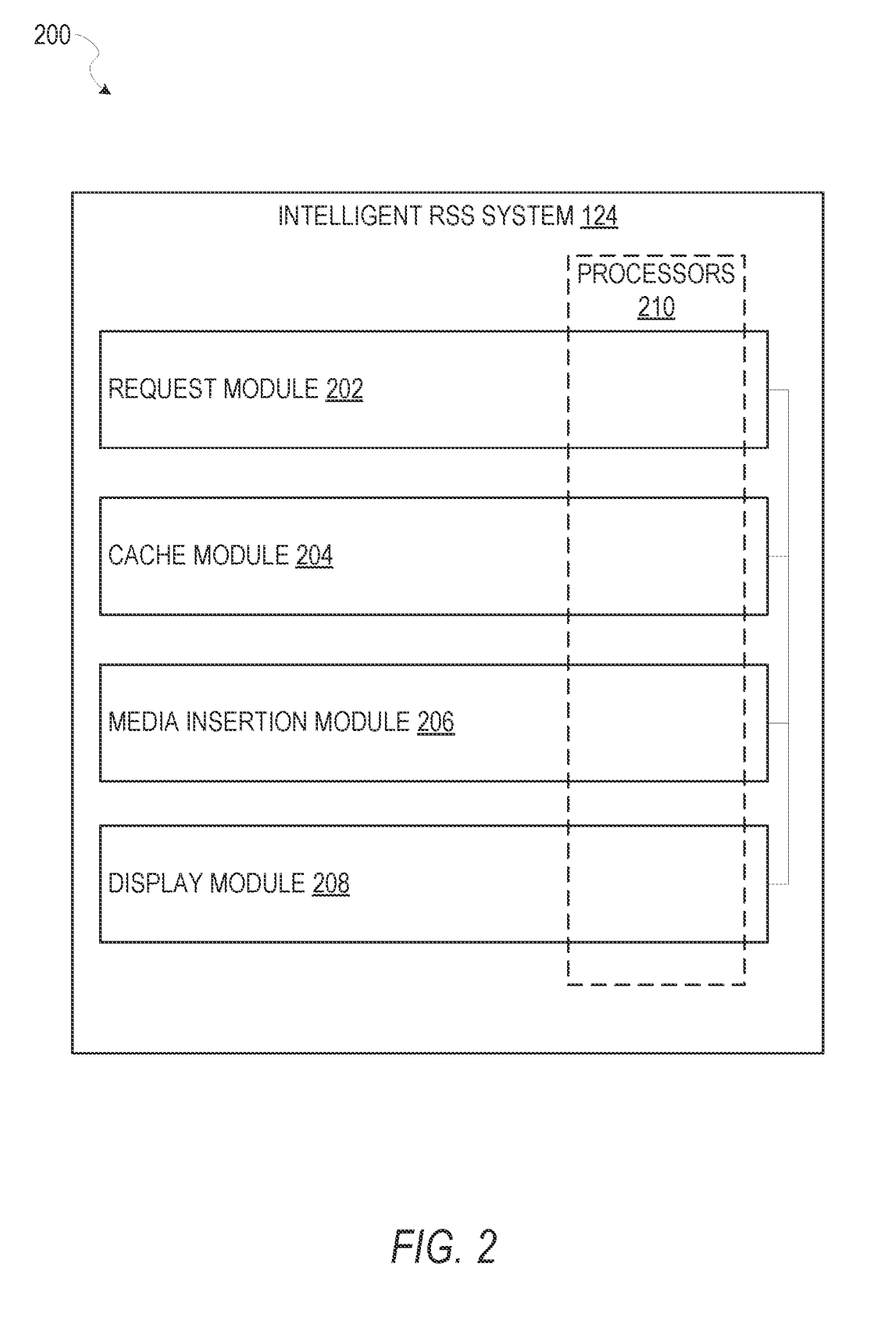
FIG. 2 is a block diagram illustrating various modules of an intelligent RSS system, according to certain example embodiments.

FIG. 2 is a block diagram 200 illustrating components of the intelligent RSS system 124 that configure the intelligent RSS system 124 to perform operations to provide an intelligent RSS feed, according to some example embodiments.

The intelligent RSS system 124 is shown as including a request module 202, a cache module 204, a reporting module 206, and a display module 208, all configured to communicate with each other (e.g., via a bus, shared memory, or a switch). Any one or more of these modules may be implemented using one or more processors 210 (e.g., by configuring such one or more processors to perform functions described for that module) and hence may include one or more of the processors 210.

Any one or more of the modules described may be implemented using hardware alone (e.g., one or more of the processors 210 of a machine) or a combination of hardware and software. For example, any module described of the analytics reporting system 124 may physically include an arrangement of one or more of the processors 210 (e.g., a subset of or among the one or more processors of the machine) configured to perform the operations described herein for that module. As another example, any module of the analytics reporting system 124 may include software, hardware, or both, that configure an arrangement of one or more processors 210 (e.g., among the one or more processors of the machine) to perform the operations described herein for that module. Accordingly, different modules of the analytics reporting system 124 may include and configure different arrangements of such processors 210 or a single arrangement of such processors 210 at different points in time. Moreover, any two or more modules of the analytics reporting system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 3:
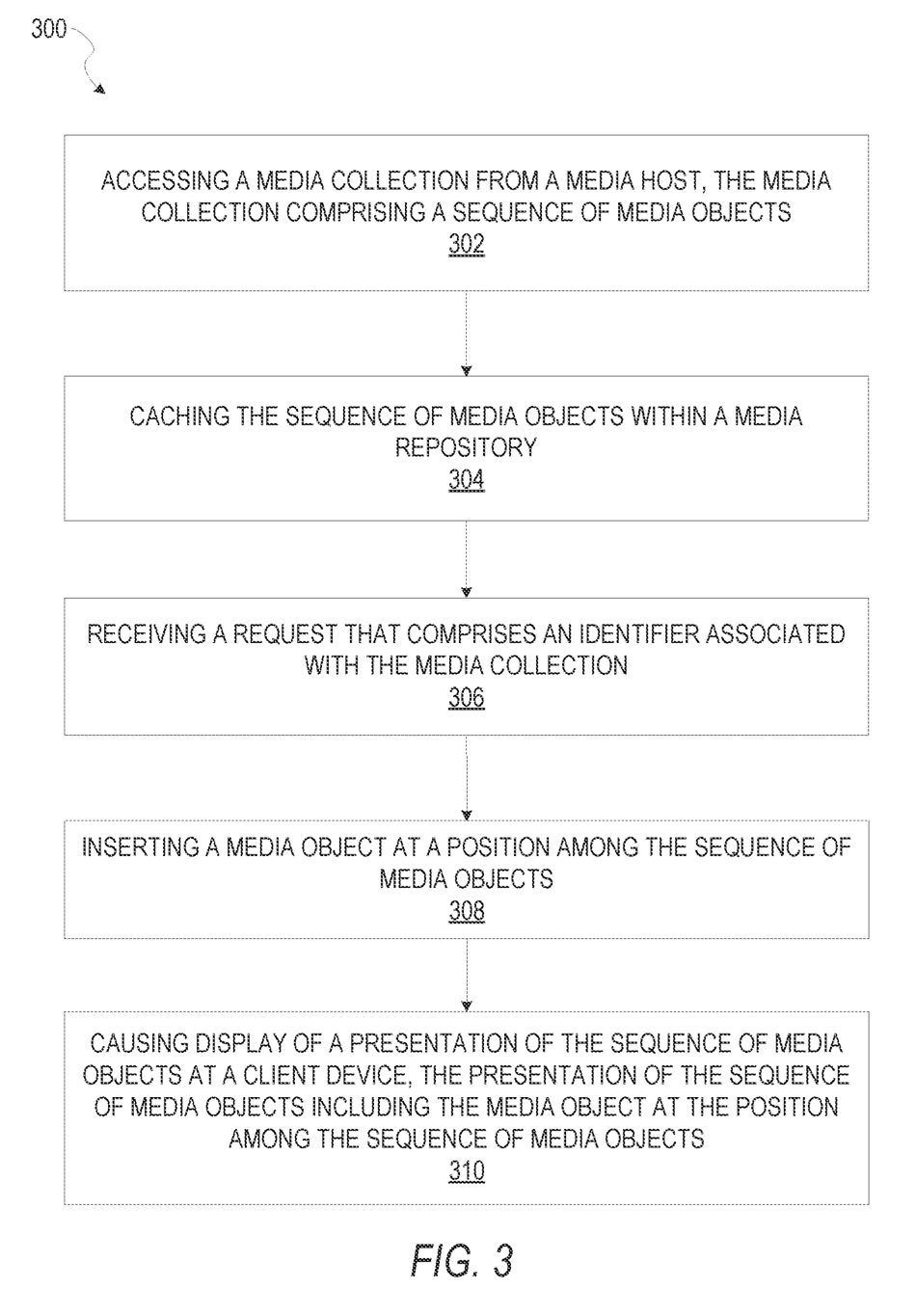
FIG. 3 is a flowchart depicting a method of providing an intelligent RSS feed, according to certain example embodiments.

FIG. 3 is a flowchart depicting a method 300 of providing an intelligent RSS feed, according to certain example embodiments. Operations of the method 300 may be performed by the modules described above with respect to FIG. 2. As shown in FIG. 3, the method 300 includes one or more operations 302, 304, 306, 308, and 310.

At operation 302, the cache module 204 accesses a media collection at a media host, wherein the media collection comprises a sequence of media objects. For example, the cache module 204 may access a database 120 from among the databases 120 to retrieve a media collection, wherein the media collection comprises an RSS feed. In some embodiments, the cache module 204 may access the database 120 responsive to some trigger event, such as determining that a new media object has been added to the media collection.

In some embodiments, the cache module 204 may access the database 120 to retrieve the media collection based on a predefined interval. At operation 304, the cache module 204 caches the sequence of media objects associated with the media collection within a media repository that may be accessed by the intelligent RSS system 124 at a later time.

At operation 306, the request module 202 receives a request that comprises an identifier associated with the media collection cached by the cache module 204. For example, a user of a client device 122 may provide an input through the client application 114, wherein the input comprises a selection or identification of the identifier associated with the media collection.

At operation 308, the media insertion module 206 inserts a media object (from among a plurality of available media objects) at a position among the sequence of media objects associated with the media collection. Further detail related to how the media object is selected, and how the position is determined is described in the method 500 depicted in FIG. 5.

Figure 6:
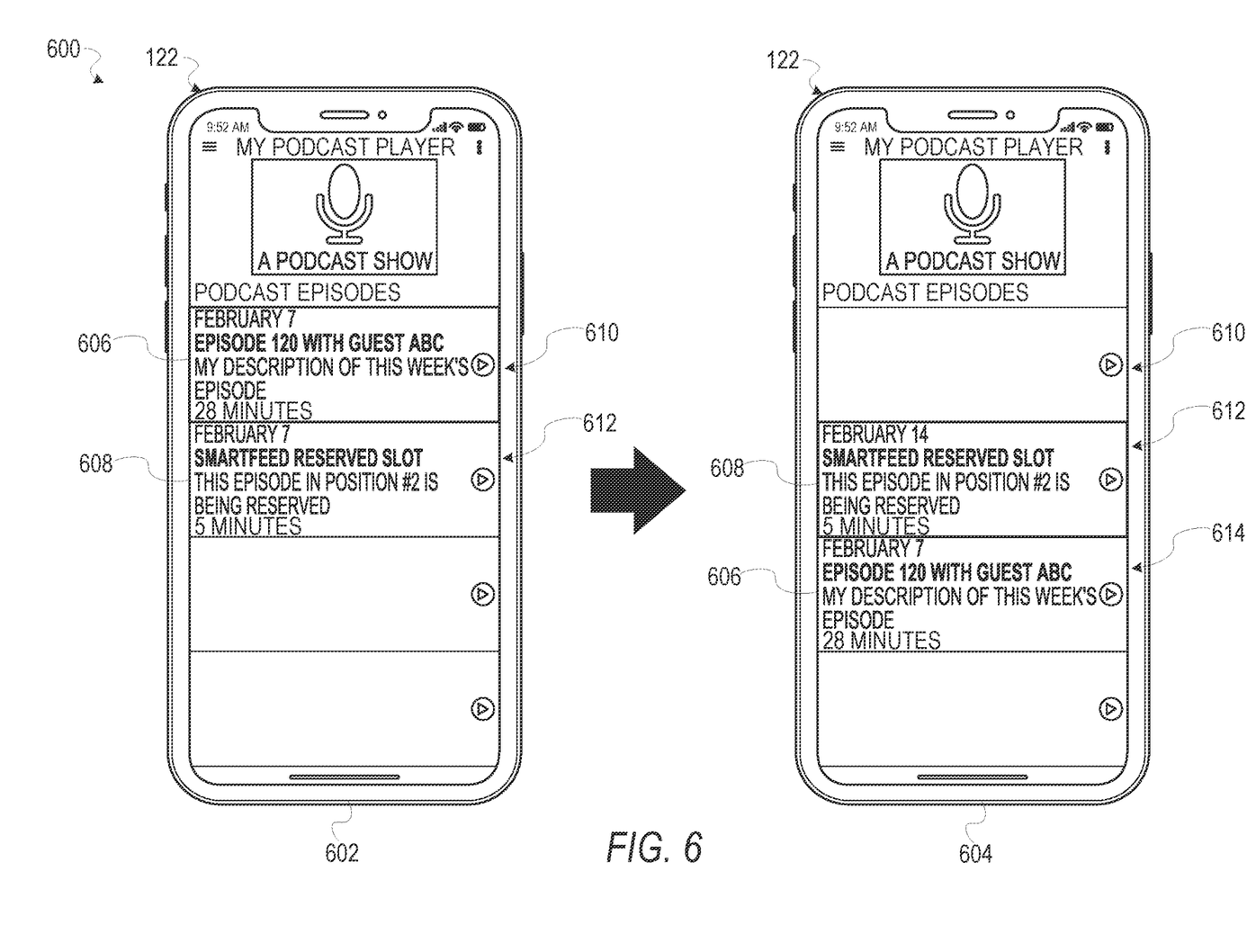
FIG. 6 is an interface diagram depicting an intelligent RSS feed presented within a graphical user interface (GUI), according to certain example embodiments.

At operation 310, the display module 308 causes display of a presentation of the sequence of media objects associated with the media collection at the client device 122, wherein the presentation of the sequence of media objects includes the media object inserted into the position among the sequence of media objects by the insertion module 206. The interface diagram 600 depicted in FIG. 6 provides additional detail related to the presentation of the sequence of media objects.

Figure 4:
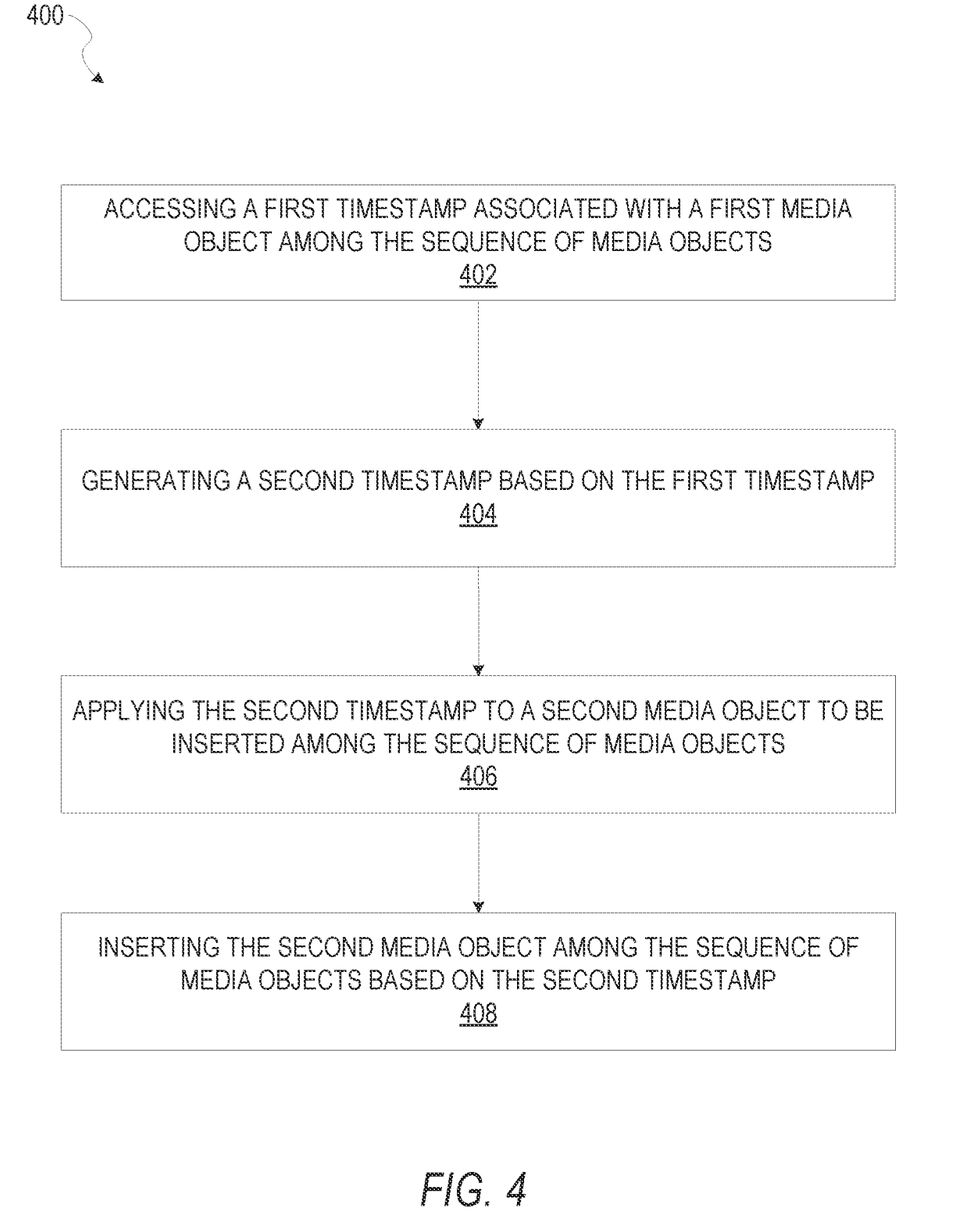
FIG. 4 is a flowchart depicting a method of providing an intelligent RSS feed, according to certain example embodiments.

FIG. 4 is a flowchart depicting a method 400 of providing an intelligent RSS feed, according to certain example embodiments. Operations of the method 400 may be performed by the modules described above with respect to FIG. 2. In some embodiments, the method 400 may be performed as a subroutine of one or more operations of the method 300, such as operation 308 in which the insertion module 206 inserts the media object at the position among the sequence of media objects. As shown in FIG. 4, the method 400 includes one or more operations 402, 404, 406, and 408.

For example, in some embodiments, the sequence of media objects may be based on timestamps assigned to each media object among the sequence of media objects. As discussed above, in a typical RSS feed, each RSS file comprises a list of items, wherein each item has properties that include: a title; a summary; a timestamp; and a link to a URL. When an RSS file is updated within a host system, all external sites or user browsers that subscribe to the RSS feed are updated as well, wherein one or more of the properties, such as the timestamps, may define a sequence in which the list of items are to be presented.

For purposes of explanation, the disclosure below includes the terms "first," and "second." These terms are intended to serve as differentiators and may not necessarily indicate or define a specific sequential position of a given media object. Accordingly, a "first media object" may not actually be the first in a sequence.

Responsive to the operation 306 in which the request module 202 receives a request that comprises an identifier associated with the media collection, at operation 402 the cache module 204 accesses a first timestamp associated with a first media object among the sequence of media objects associated with the media collection, wherein the first media object is at a position prior to an intended position in which a second media object (i.e., a selected media object) is to be inserted.

At operation 404, the media insertion module 206 generates a second timestamp based on the first timestamp of the first media object. In some embodiments, the second timestamp may be based on attributes of the media collection. For example, in some embodiments the media collection may comprise an "episodic" sequence of media objects, wherein the most recent media object published to the media collection is presented first. In some embodiments, the media collection may comprise a "serial" collection of media objects, wherein the media objects are presented in chronological order, with the earliest published media objects being presented first. Accordingly, the media insertion module 206 may generate the second timestamp to occur later than the first timestamp in the instance where the media collection comprises a serial sequence of media objects, or may generate the second timestamp to occur earlier than the first timestamp in the instance where the media collection comprises an episodic sequence of media objects.

At operation 406, the media insertion module 206 applies the second timestamp to the second media object (i.e., the selected media object), wherein the second timestamp defines the position in which the second media object is to be inserted among the sequence of media objects. Accordingly, at operation 408 the media insertion module 206 inserts the second media object at the position among the sequence of media objects based on the second timestamp.

Figure 5:
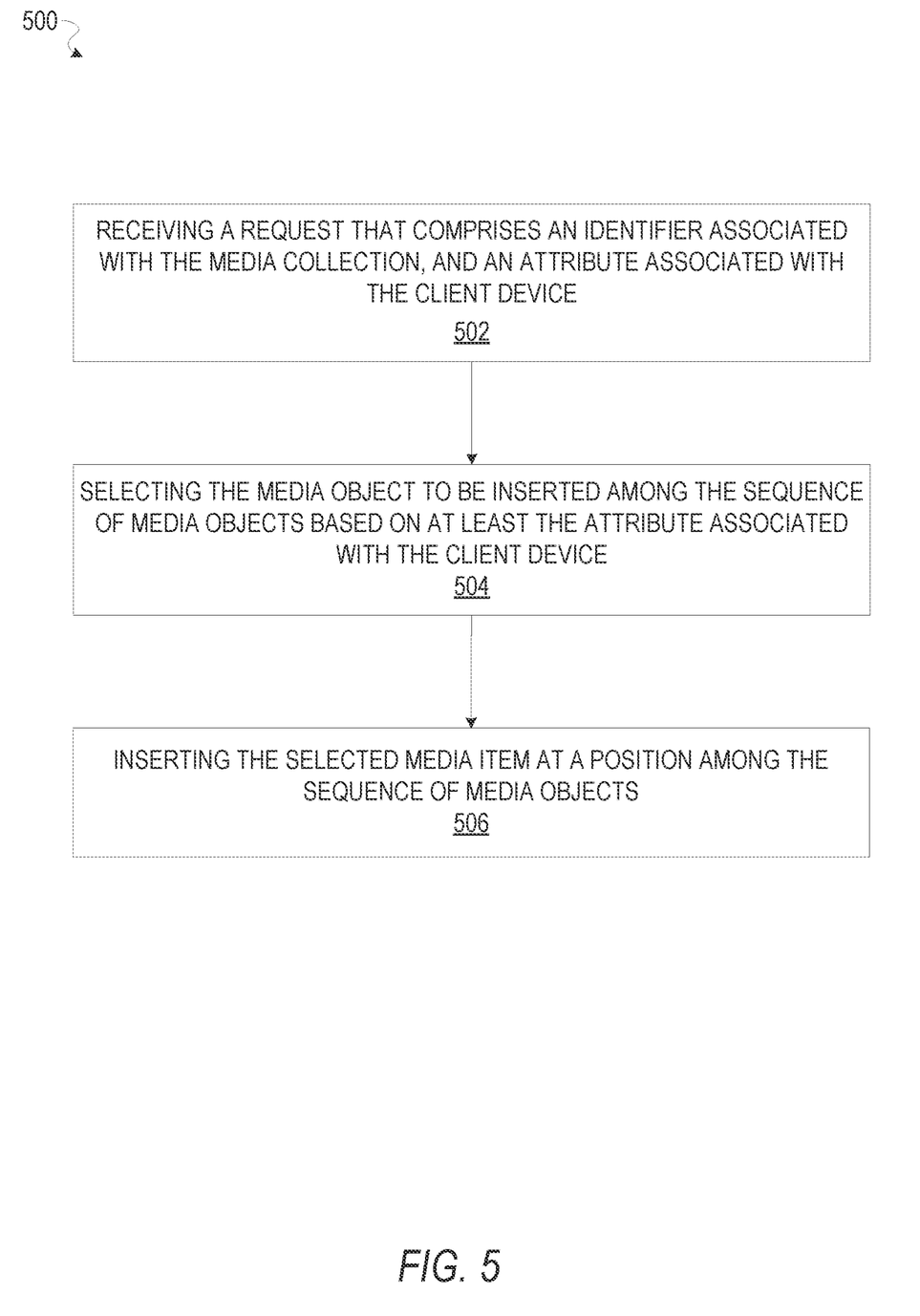
FIG. 5 is a flowchart depicting a method of providing an intelligent RSS feed, according to certain example embodiments.

FIG. 5 is a flowchart depicting a method 500 of providing an intelligent RSS feed, according to certain example embodiments. Operations of the method 500 may be performed by the modules described above with respect to FIG. 2. In some embodiments, the method 500 may be performed as a subroutine of one or more operations of the method 300, such as operation 308. As shown in FIG. 5, the method 500 includes one or more operations 502, 504, and 506.

At operation 502, the request module 202 receives a request that comprises an identifier associated with a media collection. In some embodiments, the request may be generated by a client device 122 and may include one or more attributes associated with the client device 122. For example, the request may include a user identifier associated with the client device 122, location data associated with the client device 122, as well as an indication of a device type of the client device 122.

At operation 504, the media insertion module 206 selects a media object to be inserted among the sequence of media object based on at least the attribute associated with the client device 122. For example, the media object may be indexed within a media repository (such as a database 120 from among the databases 120) based on attributes of the client device 122.

At operation 506, the media insertion module 206 inserts the selected media object at a position among the sequence of media objects. In some embodiments, the position that the media object is inserted may be determined based on attributes of the selected media object. For example, the selected media object may comprise properties to define a position to display the selected media object among a sequence of media objects.

FIG. 6 is an interface diagram 600 depicting an intelligent RSS feed presented within a graphical user interface (GUI) of a client device 122, according to certain example embodiments, and as discussed in the method 300, 400, and 500 as depicted in FIGS. 3, 4, and 5.

As seen in the interface diagram 600, a GUI 602 may display a sequence of media objects that correspond with a selected media collection at a client device 122. As seen in the GUI 602, a first media object 606 associated with the sequence of media objects may be presented at a position 610 among the presentation of the sequence of media objects, while a selected media object 608 is presented at a position 612, wherein the position 612 may be reserved for the display of media objects selected by the intelligent RSS system 124.

As seen in the GUI 604, subsequent media objects added to the media collection (i.e., by a content creator associated with the media collection), may again be presented at the position 610, while the selected media object 608 may remain at the position 612, and the first media object 606 may be moved to position 614.

Accordingly, while new content may be released and presented among the sequence of media objects, a content creator associated with the collection of media objects may reserve a position (i.e., position 612) for the display of content which may be selected based on the methods described in FIGS. 3, 4, and 5.

Figure 7:
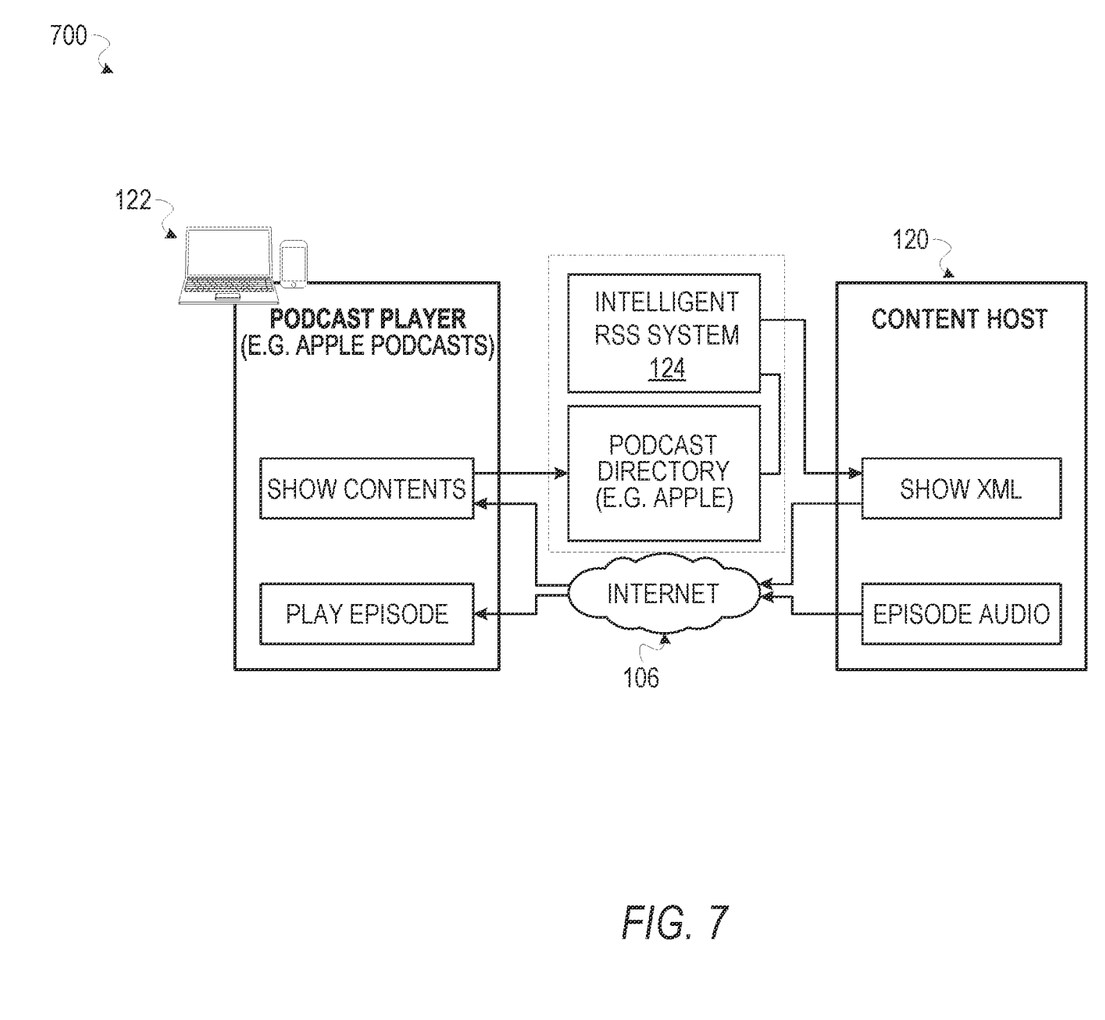
FIG. 7 is block diagram illustrating an example system for providing an intelligent RSS feed, according to certain example embodiments.

FIG. 7 is a block diagram 700 illustrating an implementation of an example system for providing an intelligent RSS feed, according to certain example embodiments.

Figure 8:
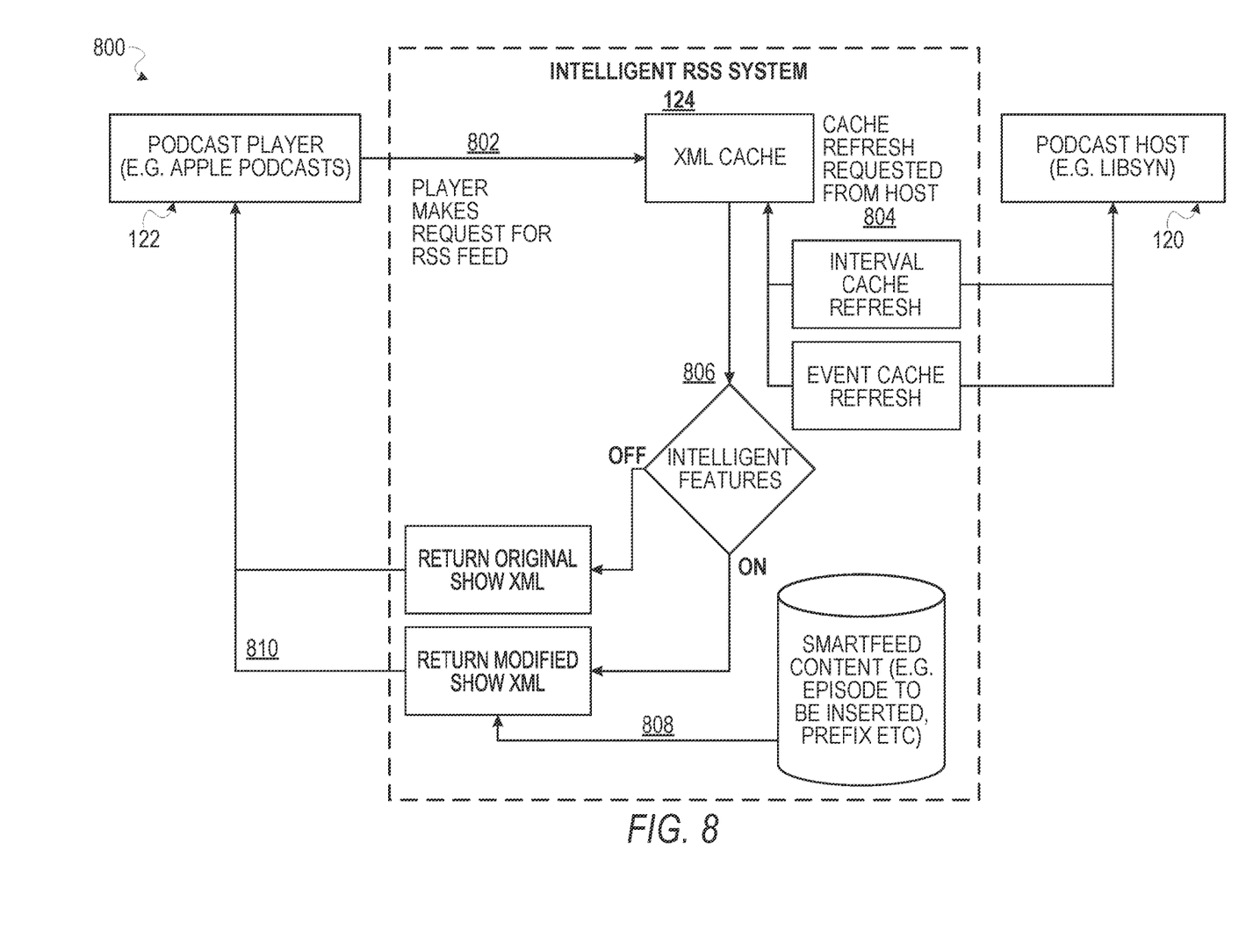
FIG. 8 is block diagram illustrating an example system for providing an intelligent RSS feed, according to certain example embodiments.

In some embodiments, the intelligent RSS system 124 may be implemented by providing an address change within a media directory (i.e., a Podcast Directory), such that an address of a requested media collection within the media directory points to the intelligent RSS system 124, rather than directly to an RSS feed associated with the media collection within a host of the media collection (i.e., the database 120). Accordingly, the intelligent RSS system 124 may access and cache a "mirror XML" of the RSS feed associated with the media collection within an associated media repository associated with the intelligent RSS system 124. This "mirror XML" cached by the intelligent RSS system 124 is therefore a replica of the RSS feed associated with the media collection, with selected media objects/content inserted at the appropriate positions among the sequence of media objects associated with the media collection. FIG. 8 provides further detail related to such an implementation.

FIG. 8 is a block diagram 800 illustrating an example system for providing an intelligent RSS feed, according to certain example embodiments.

As seen in the block diagram 800, at operation 802, a podcast player (i.e., a client device 122) may provide a request to a podcast directory to return an RSS feed associated with a requested media collection. As discussed in FIG. 7, according to certain embodiments, the address associated with the media collection may point to the intelligent RSS system 124 rather than directly to the podcast host (i.e., the database 120).

As seen in FIG. 8, at operation 804 (which may occur independent of the request received at operation 802), the intelligent RSS feed 124 may receive a cache refresh request from the host of the media collection (i.e., database 120), wherein the cache refresh request may include an interval cache refresh, or an event-based cache refresh. The intelligent RSS system 124 may thereby cache the RSS feed associated with the media collection at a media repository accessible by the intelligent RSS system 124.

At operation 806, the intelligent RSS system 124 determines whether or not the intelligent RSS feed feature has been enabled by a user of the intelligent RSS system 124. In some example embodiments, the intelligent RSS features may be enabled by a content creator associated with the media collection hosted at the database 120.

Accordingly, should the intelligent RSS feed feature be disabled, the intelligent RSS system 124 may simply return an unmodified mirror of the RSS feed cached by the intelligent RSS system 124 at operation 804. Should the intelligent RSS feed feature be enabled, at operation 808, the intelligent RSS system 124 may access "smartfeed content" to be inserted into an appropriate position among the sequence of media objects associated with the media collection.

In some embodiments, the smartfeed content to be inserted may be based on a number of factors including a type of media/podcast player being executed by the client device 122, as well as various user attributes, location data, and device attributes associated with the client device 122.

As discussed above, each media object among a sequence of media objects from a media collection may comprise an address that references a location of a media file associated with the media object. For example, the media file may include an audio file, such as a podcast. In some embodiments, the intelligent RSS system 124 may be configured to modify the address of the corresponding media file, by applying an analytics prefix to the corresponding address (i.e., the URL). By doing so, the intelligent RSS system 124 may measure downloads of the media objects accessed by users of the intelligent RSS system 124.

For example, the intelligent RSS system 124 may prepend an analytics "prefix" to a URL, such that the URL "https:/podcast.com/show/ep1.mp3," may be modified as, https://prefix analytics.com/podcast.com/show/ep1.mp3." As such, by referencing the modified URL, the intelligent RSS system 124 may collect relevant metrics for presentation to an administrator associated with the published content (i.e., the media file).

In some embodiments, the smartfeed content may be selected from a media repository, wherein content hosted within the media repository may be ranked based on an auction-based bidding system. For example, a third-party content creator may submit a bid to the intelligent RSS system 124, wherein the bid comprises: content to be inserted into a sequence of media objects; an identification of a position among the sequence of media objects; and a bid amount. The intelligent RSS system 124 may thereby rank the bid among a plurality of bids in order to determine which content is to be selected for display among a sequence of media objects.

At operation 810, the intelligent RSS system 124 may thereby return a modified RSS feed associated with the requested media collection, wherein the RSS feed includes content inserted by the intelligent RSS system 124 at a specified position among a presentation of the media objects associated with the media collection.

Figure 9:
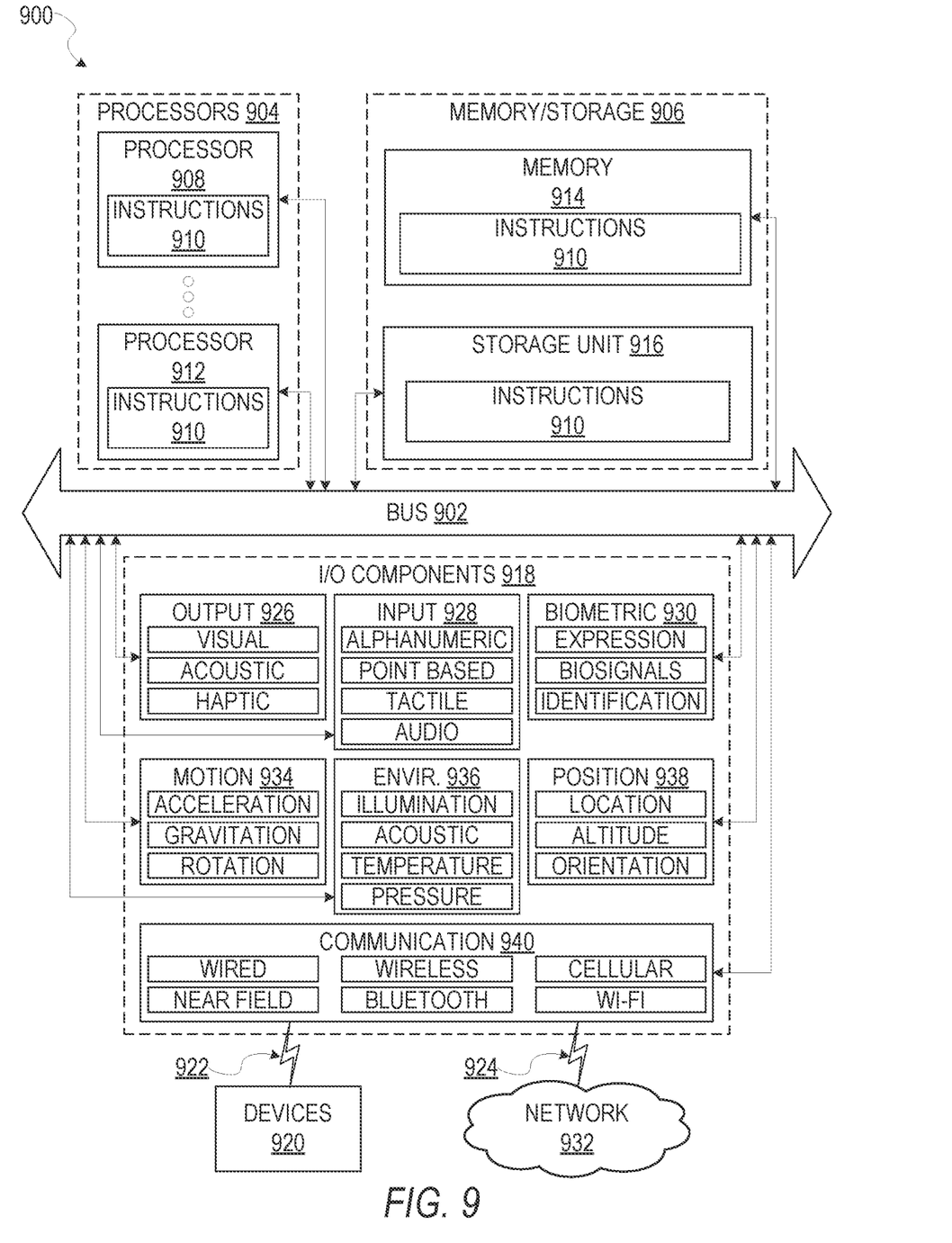
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

What is claimed is:
1. A method comprising:
   caching a media collection within a media repository, the media collection comprising a sequence of media objects that include at least a first media object at a first position that corresponds with a first timestamp among the sequence of media objects;
   receiving, from a client device, a request that includes an identifier associated with the media collection and comprises one or more request attributes;
   accessing a media object from among a plurality of media objects based on at least the one or more request attributes of the request, the media object comprising a media attribute;
   determining a second position to present, the media object among the sequence of media objects based on the media attribute of the media object and the first timestamp of the first media object:
   inserting the media object at a second position among the sequence of media objects, the second position corresponding with a second timestamp; and causing display of a presentation of the sequence of media objects at the client device, the presentation of the sequence of media objects including the media object at the second position among the sequence of media objects.

2. The method of claim 1, wherein the sequence of media objects comprises a Really Simple Syndication (RSS) feed.

3. The method of claim 1, wherein the request comprises the identifier associated with the media collection and a user identifier associated with the client device, and wherein the inserting the media object at the position among the sequence of media objects further comprises:
  selecting the media object based on the user identifier.

4. The method of claim 1, wherein the request comprises the identifier associated with the media collection and a user identifier associated with the client device, and wherein the inserting the media object at the position among the sequence of media objects further comprises:
  determining the position among the sequence of media objects based on the user identifier.

5. The method of claim 1, wherein the sequence of media objects is an episodic sequence of media objects, and wherein the generating the second timestamp based on the first timestamp further comprises:
  generating the second timestamp to occur earlier than the first timestamp.

6. The method of claim 1, wherein the sequence of media objects is a serial sequence of media objects, and wherein the generating the second timestamp based on the first timestamp further comprises:
  generating the second timestamp to occur later than the first timestamp.

7. The method of claim 1, wherein the request comprises the identifier associated with the media collection and an indication of a device type of the client device, and wherein the inserting the media object at the position among the sequence of media objects further comprises:
  selecting the media object based on the device type of the client device.

8. The method of claim 1, wherein:
  the request comprises the identifier associated with the media collection, and location data that identifies a location of the client device; and
  the inserting the media object at the position among the sequence of media objects further comprises:
  selecting the media object based on the location data that identifies the location of the client device.

9. A system comprising:
  a memory; and
  at least one hardware processor to perform operations comprising:
  caching a media collection within a media repository, the media collection comprising a sequence of media objects that include at least a first media object at a first position that corresponds with a first timestamp among the sequence of media objects;
  receiving, from a client device, a request that includes an identifier associated with the media collection, and comprises one or more request attributes;
  accessing a media object from among a plurality of media objects based on at least the one or more request attributes of the request, the media object comprising a media attribute:
  determining a second position to present the media object among the sequence of media objects based on the media attribute of the media object and the first timestamp of the first media object:
  inserting the media object at a second position among the sequence of media objects, the second position corresponding with a second timestamp; and
  causing display of a presentation of the sequence of media objects at the client device, the presentation of the sequence of media objects including the media object at the second position among the sequence of media objects.

10. The system of claim 9, wherein the sequence of media objects comprises a Really Simple Syndication (RSS) feed.

11. The system of claim 9, wherein the request comprises the identifier associated with the media collection and a user identifier associated with the client device, and wherein the inserting the media object at the position among the sequence of media objects further comprises:
  selecting the media object based on the user identifier.

12. The system of claim 9, wherein the request comprises the identifier associated with the media collection and a user identifier associated with the client device, and wherein the inserting the media object at the position among the sequence of media objects further comprises:
  determining the position among the sequence of media objects based on the user identifier.

13. The system of claim 9, wherein the sequence of media objects is an episodic sequence of media objects, and wherein the generating the second timestamp based on the first timestamp further comprises:
  generating the second timestamp to occur earlier than the first timestamp.

14. The system of claim 9, wherein the sequence of media Objects is a serial sequence of media objects, and wherein the generating the second timestamp based on the first timestamp further comprises:
  generating the second timestamp to occur later than the first timestamp.

15. The system of claim 9, wherein the request comprises the identifier associated with the media collection and an indication of a device type of the client device, and wherein the inserting the media object at the position among the sequence of media objects further comprises:
  selecting the media object based on the device type of the client device.

16. The system of claim 9, wherein:
  the request comprises:
  the identifier associated with the media collection; and
  location data that identifies a location of the client device, and
  the inserting the media object at the position among the sequence of media objects further comprises:
  selecting the media object based on the location data that identifies the location of the client device.

17. A non-transitory machine-readable storage medium comprising instructions that, when executed by one or more processors of a machine, cause the machine to perform operations comprising:
  caching a media collection within a media repository, the media collection comprising a sequence of media objects that include at least a first media object at a first position that corresponds with a first timestamp among the sequence of media objects;
  receiving, from a client device, a request that includes an identifier associated with the media collection, and comprises one or more request attributes;
  accessing a media object from among a plurality of media objects based on at least the one or more request attributes of the request, the media object comprising a media attribute;

determining a second position to present, the media object among the sequence of media objects based on the media attribute of the media object and the first timestamp of the first media object:

inserting the media object at a second position among the sequence of media objects, the second position corresponding with a second timestamp; and causing display of a presentation of the sequence of media objects at the client device, the presentation of the sequence of media Objects including the media object at the second position among the sequence of media objects.

18. The non-transitory machine-readable storage medium of claim 17, wherein the sequence of media objects comprises a Really Simple Syndication (RSS) teed.

* * * * *

UNITED STATES PATENT AND TRADEMARK OFFICE
CERTIFICATE OF CORRECTION

PATENT NO. : 12,015,686 B2
APPLICATION NO. : 17/703723
DATED : June 18, 2024
INVENTOR(S) : Lee et al.

Page 1 of 1

It is certified that error appears in the above-identified patent and that said Letters Patent is hereby corrected as shown below:

In the Claims

In Column 14, Line 55, in Claim 1, after "collection", insert --,--

In Column 14, Line 61, in Claim 1, delete "present," and insert --present-- therefor In Column 14, Line 64, in Claim 1, delete "object:" and insert --object;-- therefor In Column 15, Line 63, in Claim 9, delete "attribute:" and insert --attribute;-- therefor In Column 15, Line 67, in Claim 9, delete "object:" and insert --object;-- therefor In Column 16, Line 31, in Claim 14, delete "Objects" and insert --objects-- therefor In Column 17, Line 1, in Claim 17, delete "present," and insert --present-- therefor In Column 17, Line 4, in Claim 17, delete "object:" and insert --object;-- therefor In Column 17, Line 10, in Claim 17, delete "Objects" and insert --objects-- therefor In Column 17, Line 15, in Claim 18, delete "teed." and insert --feed.-- therefor Signed and Sealed this
First Day of July, 2025

Coke Morgan Stewart
*Acting Director of the United States Patent and Trademark Office*